United States Patent
McCarron et al.

(10) Patent No.: US 10,132,409 B2
(45) Date of Patent: Nov. 20, 2018

(54) DAMPER SEAL

(71) Applicant: Honda Motor Co., Ltd., Tokyo (JP)

(72) Inventors: Daniel G McCarron, Dublin, OH (US); Robb L Augustine, Dublin, OH (US); Matthew Lux, Dublin, OH (US); Jeremy P Lucas, Delaware, OH (US); Shohan Islam, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 15/052,026

(22) Filed: Feb. 24, 2016

(65) Prior Publication Data

US 2017/0241547 A1 Aug. 24, 2017

(51) Int. Cl.
| | |
|---|---|
| *F16J 15/02* | (2006.01) |
| *B60G 13/00* | (2006.01) |
| *F16F 1/37* | (2006.01) |
| *F16J 15/32* | (2016.01) |
| *B60R 13/06* | (2006.01) |
| *F16F 1/373* | (2006.01) |
| *B60R 13/08* | (2006.01) |
| *F16J 15/3268* | (2016.01) |

(52) U.S. Cl.
CPC ............ *F16J 15/022* (2013.01); *B60R 13/06* (2013.01); *B60R 13/0846* (2013.01); *F16F 1/3732* (2013.01); *B60G 13/003* (2013.01); *B60G 2204/128* (2013.01); *F16J 15/3268* (2013.01)

(58) Field of Classification Search
CPC ...... F16J 15/022; F16J 15/025; F16J 15/3268; B60G 2204/128; B60G 13/003; F16F 9/54; F16F 1/3735
See application file for complete search history.

(56) References Cited

U.S. PATENT DOCUMENTS

| | | | | |
|---|---|---|---|---|
| 2,926,938 A | * | 3/1960 | Ratti | F16J 15/3268 277/576 |
| 4,486,028 A | | 12/1984 | Tanahashi | |
| 4,981,287 A | | 1/1991 | Cothenet | |
| 5,595,374 A | | 1/1997 | Charette et al. | |
| 5,639,993 A | * | 6/1997 | Ideno | B60R 16/0222 174/153 G |

(Continued)

FOREIGN PATENT DOCUMENTS

| | | |
|---|---|---|
| DE | 202005021959 | 1/2012 |
| GB | 2171471 A | 8/1986 |
| WO | 2013/021050 A1 | 2/2013 |

OTHER PUBLICATIONS

"Cabin Mounting" http://www.babacanrubber.com/EN/belge/2-32/cabin-mounting.html#icerik Accessed (Jul. 30, 2015).

*Primary Examiner* — Nicholas L Foster (74) *Attorney, Agent, or Firm* — Honda Patents & Technologies North America, LLC; Mark E. Duell

(57) ABSTRACT

A seal inserted into a circular opening in a work piece from a first direction for sealing a component inserted into the circular opening from a second direction is disclosed. The seal body has a ring shape and includes an upper edge and a lower edge. An upper seal extends radially outward and downward from the upper edge of the seal body, a lower seal extends radially inward and upward from the lower edge of the seal body, and a clip secures the seal to the circular opening.

7 Claims, 8 Drawing Sheets

SECTION A-A

SECTION C-C (56) References Cited

U.S. PATENT DOCUMENTS

| | | | |
|---|---|---|---|
| 6,227,527 B1* | 5/2001 | Berg | B60G 15/14 |
| | | | 267/218 |
| 6,257,605 B1 | 7/2001 | Zernickel et al. | |
| 6,736,381 B2 | 5/2004 | Chesne | |
| 6,776,402 B2 | 8/2004 | Miyamoto et al. | |
| 6,995,317 B1* | 2/2006 | Dzurilla | B60R 16/0222 |
| | | | 16/2.1 |
| 7,238,002 B2 | 7/2007 | Cairo et al. | |
| 7,681,896 B2 | 3/2010 | Yano | |
| 7,793,584 B2 | 9/2010 | Murakami et al. | |
| 7,938,418 B1 | 5/2011 | Coombs et al. | |
| 8,596,661 B2 | 12/2013 | Kaneko et al. | |
| 8,668,213 B2 | 3/2014 | Takagi et al. | |
| 2002/0136477 A1* | 9/2002 | Beghini | B60G 15/068 |
| | | | 384/615 |
| 2003/0201613 A1* | 10/2003 | Matczak | F16L 5/10 |
| | | | 277/602 |
| 2013/0065505 A1* | 3/2013 | Yoskowitz | F24F 13/1406 |
| | | | 454/317 |
| 2014/0250631 A1* | 9/2014 | Allen | B62D 1/16 |
| | | | 16/225 |

* cited by examiner

FIG. 1

SECTION A-A
FIG. 2

SECTION B-B
FIG. 6

SECTION C-C
FIG. 7

SECTION D-D
FIG. 10

SECTION E-E
FIG. 14

SECTION F-F

FIG. 15

DAMPER SEAL

TECHNICAL FIELD

The embodiments disclosed are related to the field of component seals for a motor vehicle.

BACKGROUND

Motor vehicles often include components, such as dampers, that are installed in openings in the frames or bodies of the motor vehicles. There is a need to provide a seal between the component and the frame or body of the vehicle for to prevent water or dirt from passing through the opening, and to aid in the transmission of noise or vibrations throughout the motor vehicle. The seals should be easy to install and provide sufficient protection from the issues identified above.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a seal inserted into a circular opening in a work piece from a first direction for sealing a component inserted into the circular opening from a second direction is disclosed. The seal body has a ring shape and includes an upper edge and a lower edge. An upper seal extends radially outward and downward from the upper edge of the seal body, a lower seal extends radially inward and upward from the lower edge of the seal body, and a clip secures the seal to the circular opening.

According to another aspect, a component for a motor vehicle includes a seal inserted into a circular opening in a work piece from a first direction for sealing the component inserted into the circular opening from a second direction. The seal includes a seal body having ring shape, the seal body having an upper edge and a lower edge, an upper seal extending radially outward and downward from the upper of the seal body, a lower seal extending radially inward and upward from the lower edge of the seal body, and a clip for securing the seal to the circular opening.

According to yet another aspect, a seal inserted into a circular opening in a work piece from a first direction for sealing a component inserted into the circular opening from a second direction includes a seal body having ring shape, the seal body comprising an upper edge and a lower edge, an upper seal extending radially outward and downward from the upper of the seal body, a lower seal extending radially inward and upward from the lower edge of the seal body, and a plurality of clips spaced apart circumferentially around the seal body for securing the seal to the circular opening. Each of the plurality of clips includes a sloped body formed integrally with the seal body and extending radially outward and upward from the lower edge of the seal body, the sloped body creating an interference fit with the an inner edge of the circular opening.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are described with reference to the figures in which like reference numbers indicate identical or functionally similar elements. Also in the figures, the left most digits of each reference number corresponds to the figure in which the reference number is first used.

Figure 1:
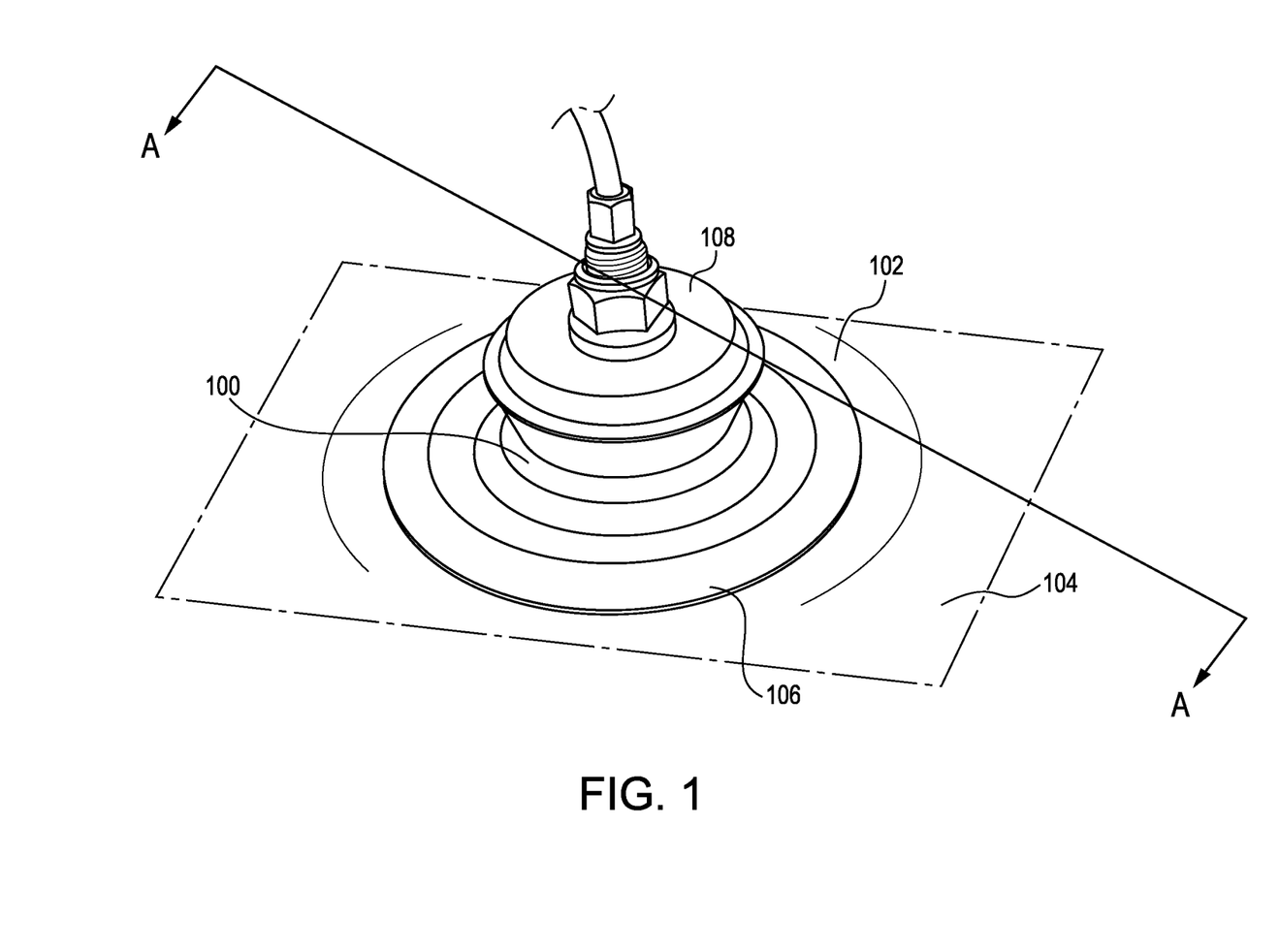
FIG. 1 is a perspective view of a damper and a seal installed in a work piece.

FIG. 1 illustrates a damper 100 inserted into a circular opening 102 of a component 104, which may be a body part of motor vehicle or any other apparatus that may require installation of any parts into circular openings. Further illustrated is a seal 106 for sealing between the circular opening 102 and the damper 100. The damper 100 may then be connected to a damper harness 108.

Figure 2:
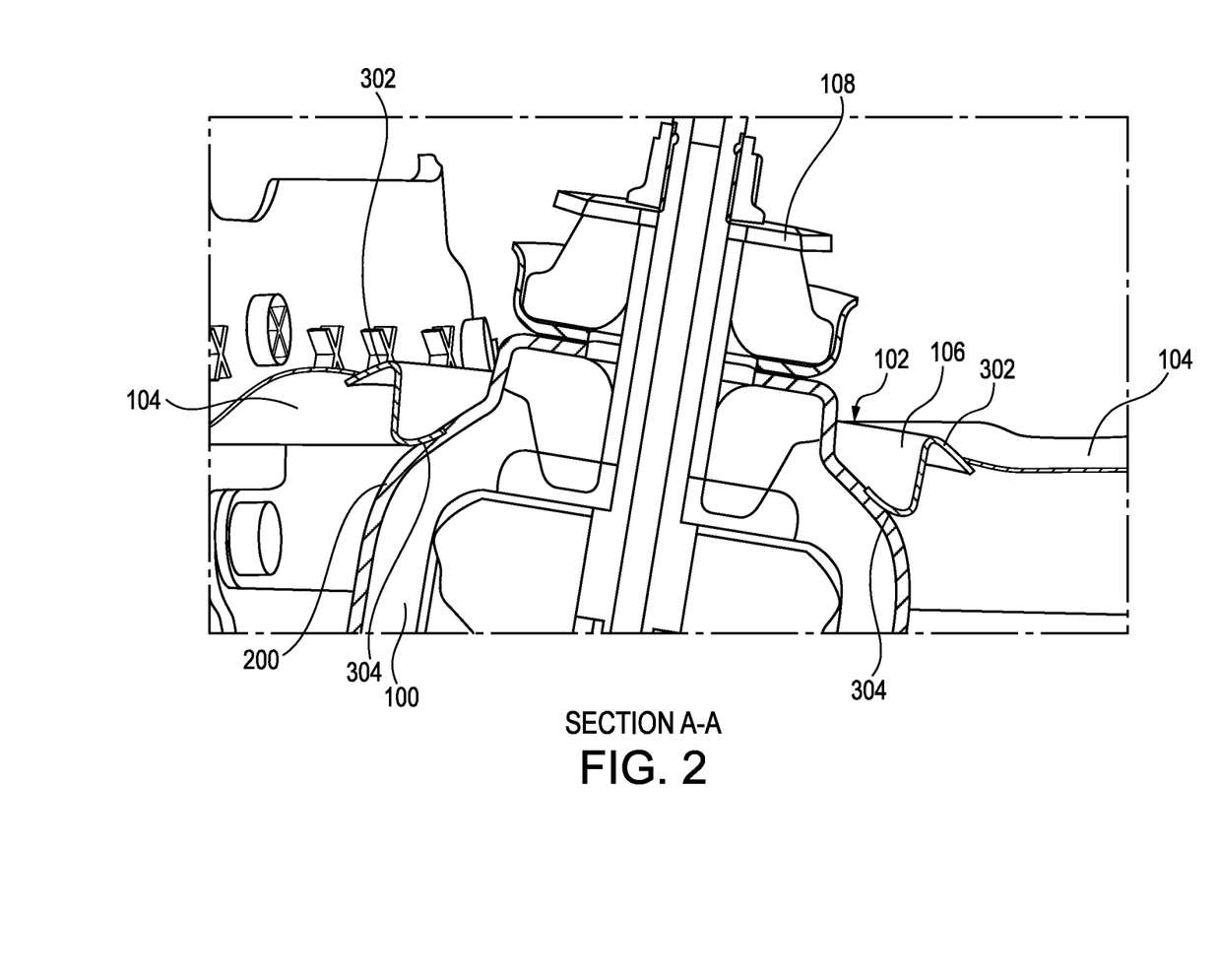
FIG. 2 is a side cross-sectional view along line A-A of FIG. 1.
Figure 3:
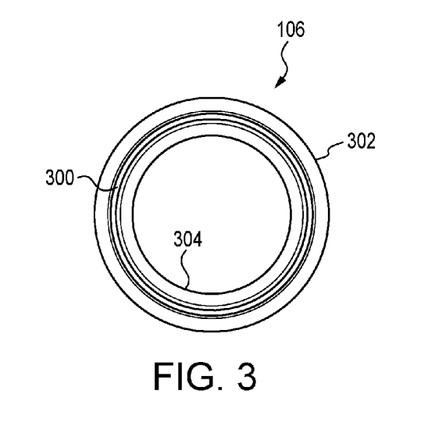
FIG. 3 is a top view of an embodiment of a seal.
Figure 4:
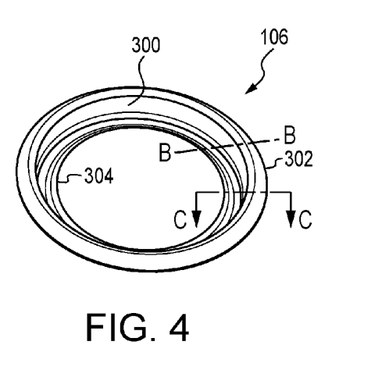
FIG. 4 is a perspective view of the embodiment of the seal shown in FIG. 3.

FIG. 2, which is a cross-section along Section A-A of FIG. 1, and FIGS. 3-7 show the seal 106 in greater detail. The seal 106 is ring-shaped or circular to fit within the circular opening 102 of the component 104.

As illustrated in FIGS. 3-7, the seal 106 includes a seal body 300, an upper seal 302, and a lower seal 304. The upper seal 302 extends radially outward and downward from an upper edge 600 of the seal body 300. The upper seal 302 is flexible and rests against the component 104. The lower seal 304 extends inwardly and upwardly from a lower edge 602 of the seal body 300. The upper seal 302 acts to provide sealing around the edge of the circular opening 102. The lower seal 304 acts to provide sealing around a body 200 of the damper 100. The lower seal 304 is flexible to provide sealing against the body 200 of the damper 100.

The seal 106 is constructed of a solid yet flexible material such as plastic, rubber, or any similar material known to one skilled in the art. The material should be solid enough to maintain it shape in a steady state situation, but flexible enough to be inserted into a circular opening 102 and maintain a seal against the damper body 200.

Figure 5:
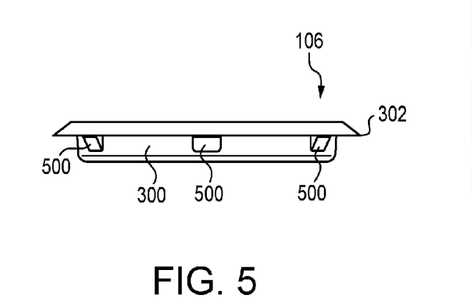
FIG. 5 is a side view of the embodiment of the seal shown in FIG. 3.
Figure 6:
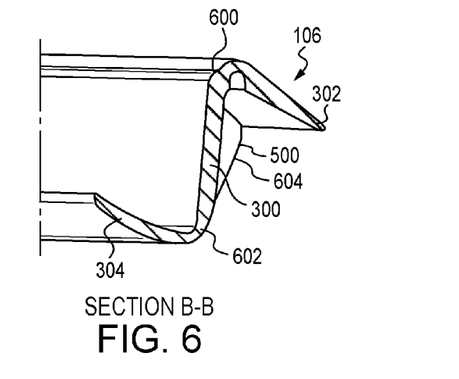
FIG. 6 is a cross-sectional view of the embodiment of the seal shown in FIG. 3 along line B-B.
Figure 7:
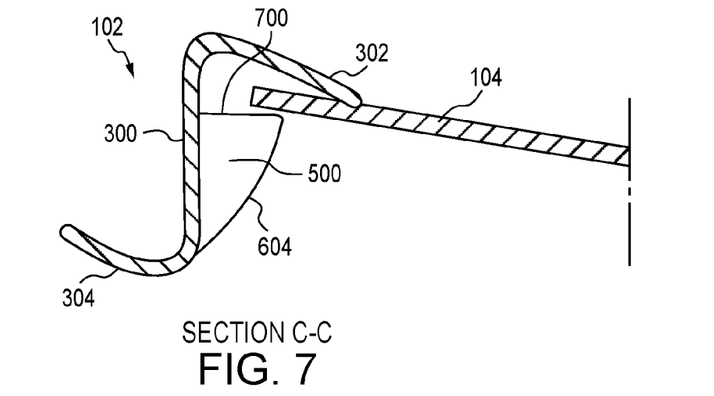
FIG. 7 is a cross-sectional view of the embodiment of the seal shown in FIG. 3 along line C-C.

The seal also include at least one or several clips 500 that hold the seal 106 in place when inserted into the circular opening 102. The clips 500 are integrally formed in the seal body 300, and include a sloped incline 604 that extends radially outward in a sloping manner from the lower edge 602 of the seal body 300 until an to an area below the upper edge 600 of the seal body 300. The sloped incline 604 permits the flexible seal 106 to be inserted into the circular opening 102, and when the component 104 passes the top 700 of the clip 500, the flexible seal 106 returns to a normal shape, and the clip 500 creates an in interference fit with the component 104.

In an alternate embodiment, the seal 106 may include a single clip 500 that extends around the complete circumference of the seal body 300.

Figure 8:
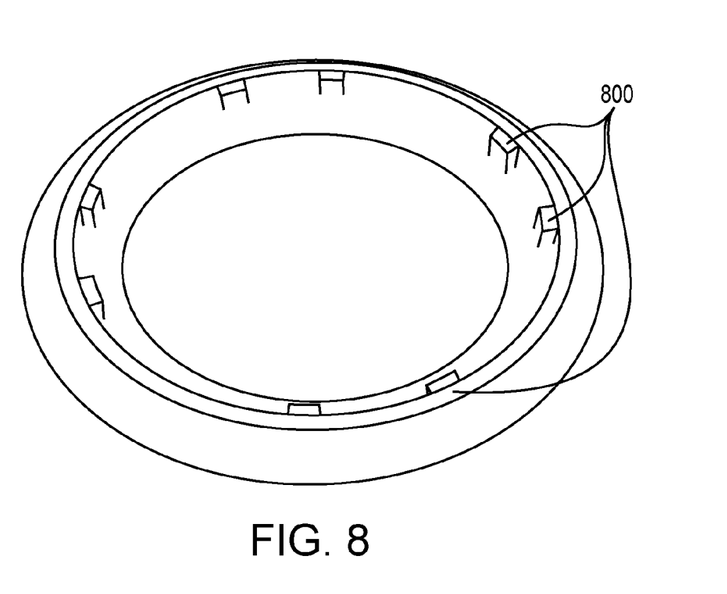
FIG. 8 is a perspective view of an alternate embodiment of a seal.

FIG. 8 shows an alternate embodiment of the seal 106 where the clips 500 are supported by supports that extend radially inward from the seal body 300 opposite the clips 500, not shown in FIG. 8.

Figure 9:
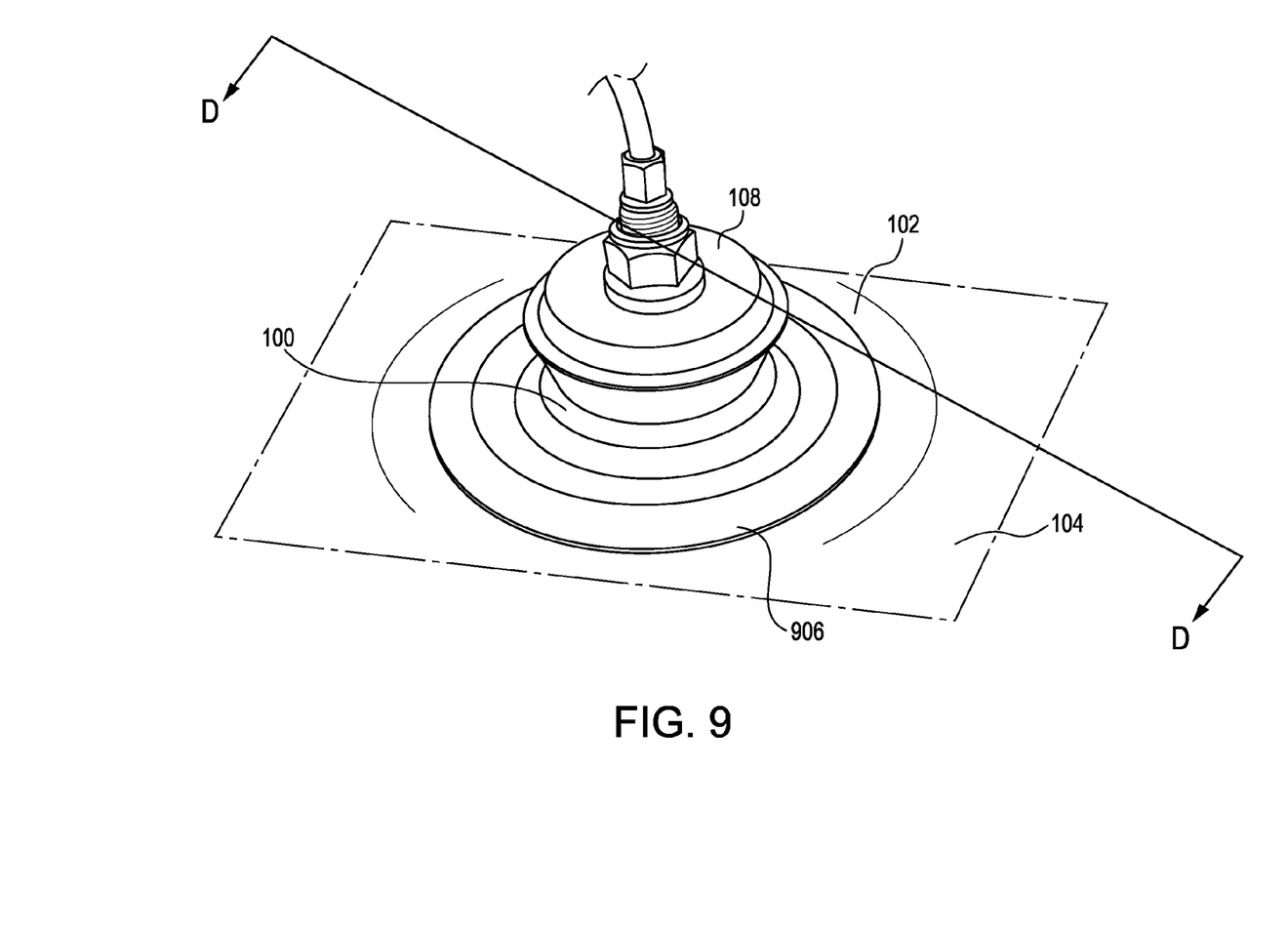
FIG. 9 is a perspective view of an alternate damper and a seal installed in a work piece.

FIG. 9 illustrates an alternate embodiment of a seal 906 of a damper 100 inserted into a circular opening 102 of a component 104. Seal 906 seals between the circular opening 102 and the damper 100. The damper 100 may then be connected to a damper harness 108.

Figure 10:
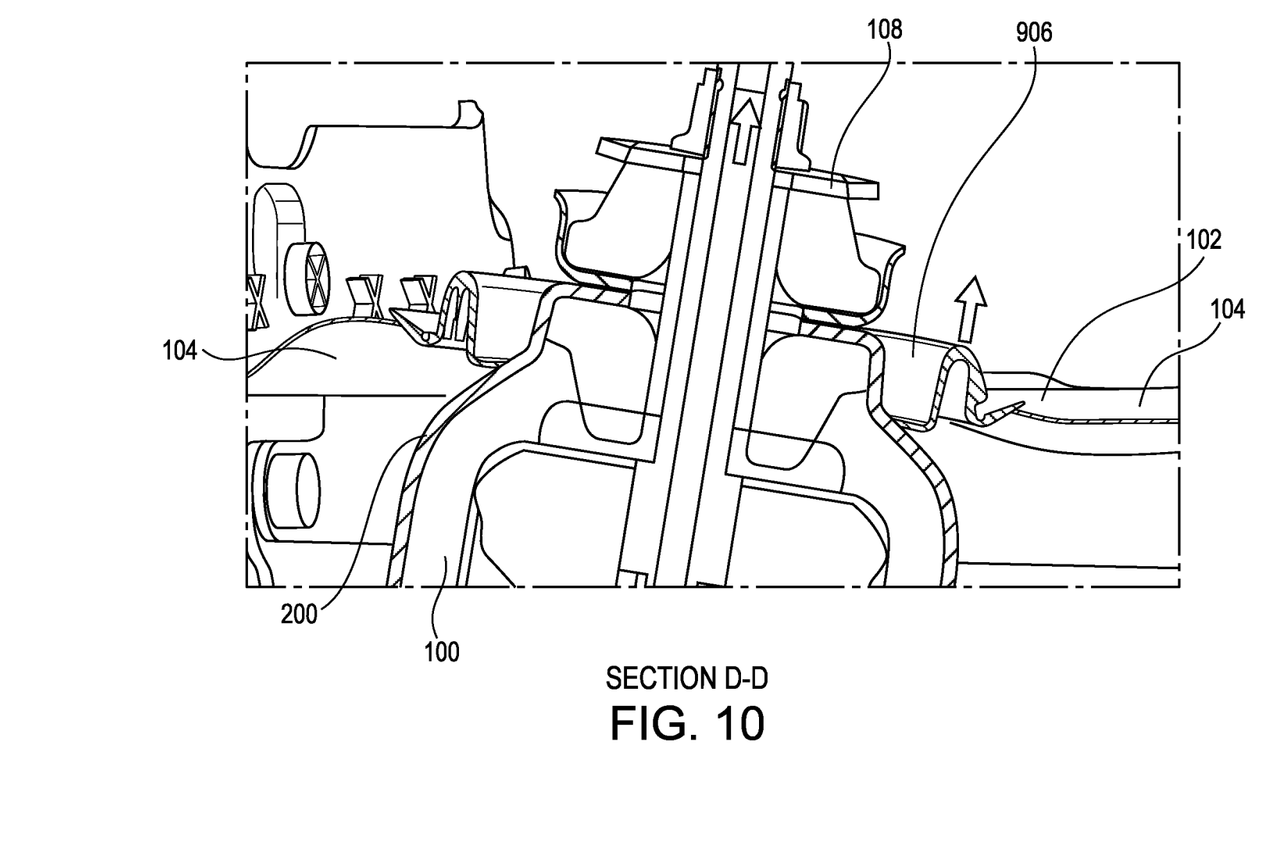
FIG. 10 is a side cross-sectional view along line D-D of FIG. 9.
Figure 11:
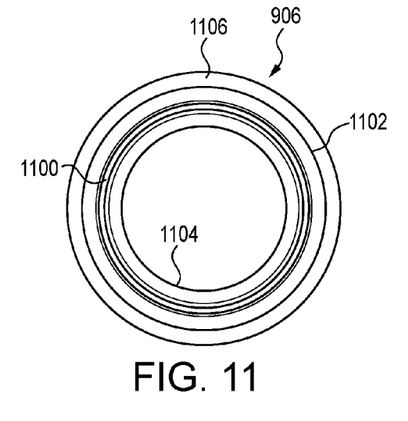
FIG. 11 is a top view of an alternate embodiment of a seal.
Figure 12:
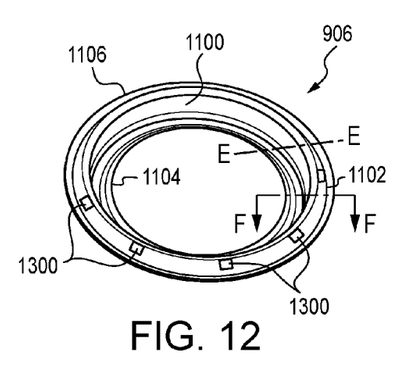
FIG. 12 is a perspective view of the embodiment of the seal shown in FIG. 11.

FIG. 10, which is a cross-section along Section D-D of FIG. 9, and FIGS. 11-15 show the seal 906 in greater detail. The seal 906 is ring-shaped or circular to fit within the circular opening 102 of the component 104.

As illustrated in FIGS. 11-15, the seal 906 includes a seal body 1100, an upper seal 1102, and a lower seal 1104. The upper seal 1102 extends downward and radially outward and from an upper edge 1400 of the seal body 1100. A radial extension 1106 outwardly and upwardly from a distal edge of the upper seal 1102. The upper seal 1102 is flexible, and the radial extension rests against the component 104. The lower seal 1104 extends inwardly and upwardly from a lower edge 1402 of the seal body 1100. The upper seal 1102 acts to provide sealing around the edge of the circular opening 102. The lower seal 1104 acts to provide sealing around a body 200 of the damper 100. The lower seal 1104 is flexible to provide sealing against the body 200 of the damper 100.

The seal 906 is constructed of a solid yet flexible material such as plastic, rubber, or any similar material known to one skilled in the art. The material should be solid enough to maintain it shape in a steady state situation, but flexible enough to be inserted into a circular opening 102 and maintain a seal against the damper body 200.

Figure 13:
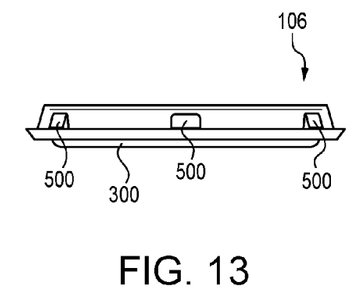
FIG. 13 is a side view of the embodiment of the seal shown in FIG. 11.
Figure 14:
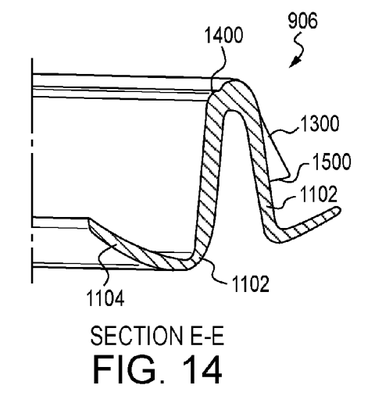
FIG. 14 is a cross-sectional view of the embodiment of the seal shown in FIG. 11 along line E-E.
Figure 15:
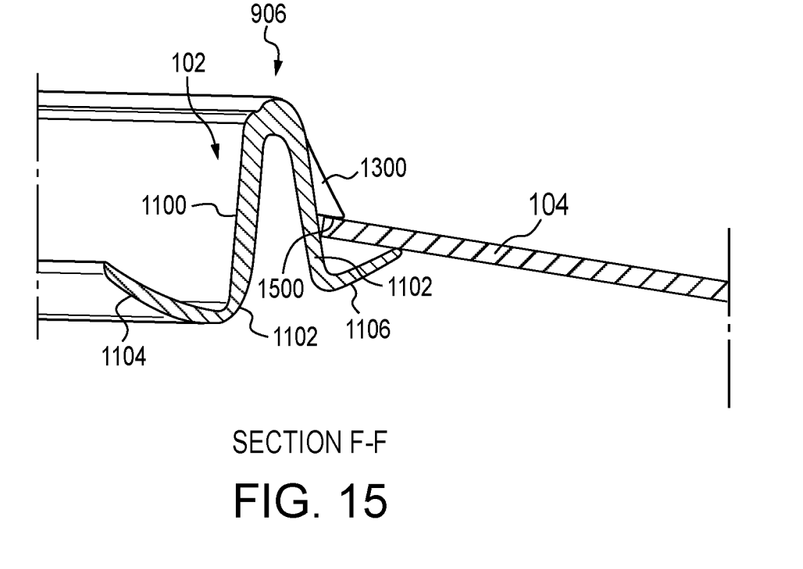
FIG. 15 is a cross-sectional view of the embodiment of the seal shown in FIG. 11 along line F-F.

The seal also include at least one or several clips 1300 that hold the seal 906 in place when inserted into the circular opening 102. The clips 1300 are integrally formed in the seal body 1100, and include a sloped incline 1404 that extends radially outward in a sloping manner from the upper edge 1400 of the seal body 1100 until an to an area above the lower edge 1402 of the seal body 300. The sloped incline 1404 permits the flexible seal 906 to be inserted into the circular opening 102 from below the circular opening, and when the component 104 passes the bottom 1500 of the clip 1300, the flexible seal 906 returns to a normal shape, and the clip 1300 creates an in interference fit with the component 104.

In an alternate embodiment, the seal 906 may include a single clip 1300 that extends around the complete circumference of the seal body 1100.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A damper seal for insertion into a circular opening in a work piece from a first direction, the damper seal for sealing a component inserted into the circular opening from a second direction, the damper seal comprising:
    a seal body having a ring shape, the seal body comprising an upper edge and a lower edge;
    an upper seal monolithic with the seal body and extending radially outward and axially downward from the upper edge of the seal body;
    a lower seal monolithic with the seal body and extending radially inward and axially upward from the lower edge of the seal body; and
    a plurality of clips monolithic with the seal body and spaced apart circumferentially for securing the damper seal to the circular opening;
    wherein each of the plurality of clips comprises a sloped inclined surface extending radially outward and axially upward from the lower edge of the seal body, and wherein an inner edge of the circular opening is to be retained between a top surface of each of the plurality of clips and the upper seal.

2. The damper seal of claim 1 wherein the damper seal is comprised of plastic.

3. The damper seal of claim 1 wherein the damper seal is comprised of rubber.

4. An assembly for a motor vehicle, the assembly comprising:
    a damper seal inserted into a circular opening in a work piece from a first direction and sealing a component inserted into the circular opening from a second direction, damper the seal comprising:
        a seal body having a ring shape, the seal body comprising an upper edge and a lower edge;
        an upper seal monolithic with the seal body and extending radially outward and axially downward from the upper edge of the seal body;
        a lower seal monolithic with the seal body and extending radially inward and axially upward from the lower edge of the seal body; and
        a plurality of clips monolithic with the seal body and spaced apart circumferentially for securing the damper seal to the circular opening;
        wherein each of the plurality of the clips comprises a sloped inclined surface extending radially outward and axially upward from the lower edge of the seal body, and where an inner edge of the circular opening is retained between a top surface of each of the plurality of clips and the upper seal.

5. A sealed damper assembly for a motor vehicle, comprising:
  a work piece having a circular opening;
  a damper inserted into the circular opening from a second direction; and
  a damper seal inserted into the circular opening from a first direction and sealing the damper to the work piece, the damper seal comprising:
    a seal body having a ring shape, the seal body comprising an upper edge and a lower edge;
    an upper seal monolithic with the seal body and extending radially outward and axially downward form the upper edge of the seal body;
    a lower seal monolithic with the seal body and extending radially inward and axially upward from the lower edge of the seal body; and
    a plurality of clips monolithic with the seal body and spaced apart circumferentially, the plurality of clips securing the damper seal to the circular opening;
    wherein each of the plurality of clips comprises a sloped inclined surface extending radially outward and axially upward from the lower edge of the seal body, and wherein an inner edge of the circular opening is retained between a top surface of each of the plurality of clips and the upper seal.

6. The damper seal of claim 5 wherein the damper seal is comprised of plastic.

7. The damper seal of claim 5 wherein the damper seal is comprised of rubber.

* * * * *